(12) United States Patent
Melbin

(10) Patent No.: US 6,397,217 B1
(45) Date of Patent: May 28, 2002

(54) HIERARCHICAL CACHING TECHNIQUES FOR EFFICIENT DYNAMIC PAGE GENERATION

(75) Inventor: Julie A. Melbin, Concord, MA (US)

(73) Assignee: FutureTense, Inc., Acton, MA (US)

( * ) Notice: Subject to any disclaimer, the term of this patent is extended or adjusted under 35 U.S.C. 154(b) by 0 days.

(21) Appl. No.: 09/262,392

(22) Filed: Mar. 4, 1999

(51) Int. Cl.[7] .......................... G06F 17/30; G06F 15/16; G06F 1/12
(52) U.S. Cl. .......................... 707/10; 707/102; 709/203; 709/217; 709/218; 709/248; 709/400
(58) Field of Search ................... 707/10, 102; 709/250, 709/203, 217, 218, 400, 248

(56) References Cited

U.S. PATENT DOCUMENTS

| | | | | |
|---|---|---|---|---|
| 5,894,554 A | * | 4/1999 | Lowery et al. | 395/200.33 |
| 5,940,834 A | * | 8/1999 | Pinard et al. | 707/102 |
| 5,941,957 A | * | 8/1999 | Ingrassia, Jr. et al. | 709/248 |
| 6,085,195 A | * | 7/2000 | Hoyt et al. | 707/10 |
| 6,085,226 A | * | 7/2000 | Horvitz | 709/203 |

OTHER PUBLICATIONS

"Deploying and Managing Web–Based Enterprise Applications," *Netscape Application Server/Whitepaper*, pp. 1–9, downloaded Dec. 16, 1998 from http://home.netscape.com/appserver/v2.1/whitepaper/index.html.

"Integrating Netscape Application Server Solutions with Existing Enterprise Systems and Applications," *Integrating Application Server Solutions . . . sting Enterprise Systems and Applications*, pp. 1–7, downloaded Dec. 16, 1998 from http://home.netscape.com/appserver/v2.1/whitepaper/extbuilder.html.

"Key Features of the KIVA Enterprise Server," *Key Features of the KIVA Enterprise Sever*, pp. 1–8, downloaded Dec. 16, 1998 from http://developer1.netscape.com:80/docs/manuals/appserv/2_1/inover2.htm.

"A Server–Side JavaScript Developers Perspective," *Netscape Application Server: An SSJS Developer's Perspective*, pp. 1–8, downloaded Dec. 16, 1998 from http://developer1.netscape.com:80/viewsource/kuslich_nas/kuslich_nas.html.

"Netscape Application Server Developer Central," *DevEdge Online—Application Server and Other Services*, pp. 1–3, downloaded Dec. 16, 1998 from http://developer1.netscape.com:80/tech/appserver/appserver.html.

"The Internet Publishing System," *FutureTense, Inc.*, pp. 1–5, downloaded Dec. 16, 1998 from http://www.futuretense.com/IPS/index.html.

* cited by examiner

*Primary Examiner*—Thomas Black
*Assistant Examiner*—Frantz Coby
(74) *Attorney, Agent, or Firm*—Bell, Boyd & Lloyd LLC (57) ABSTRACT

A system for implementing a distributed electronic publishing environment with dynamic content. With this approach, the design of the page and content of the page remain separate, and yet automatic page generation may make use of caching techniques which are appropriate for the specific level of expected page content dynamics. The purpose of the page thus drives its caching implementation. If the page is relatively static, then the entire page itself is delivered from a static cache. If, however, only certain components of the page are expected to be dynamic, then only the portions of the page which can be rendered in advance are cached. The dynamic portions of the page are represented as executable versions of elements that specify instructions for how the page is to be rendered. Furthermore, result sets are cached when the dynamic portion of the page depends upon the contents of an external database. The architecture may also be implemented in an application server environment which supports execution on a server cluster.

34 Claims, 7 Drawing Sheets

HIERARCHICAL CACHING TECHNIQUES FOR EFFICIENT DYNAMIC PAGE GENERATION

BACKGROUND OF THE INVENTION

Organizations around the world have found that electronic publishing technology improves productivity and decision making processes among their employees, customers, suppliers, and the public by providing more timely access to critical information. Web-based technologies have emerged as the most credible alternative to implement such systems at low cost.

In their earliest manifestation, Web-based publishing tools consisted for the most part of conversion programs that, for example, converted text-based documents generated by word processors such as Microsoft Word or WordPerfect, to suitable Web browser formats such as Hypertext Markup Language (HTML). However, this process rapidly became more complex. In their simplest extension, Web tools facilitated the management of hyperlinks to permit users to navigate through a series of related documents in a way that makes sense.

The typical Web page is now designed to include graphics and even multimedia-type information. Indeed, in some instances, the Web is used to supplant more traditional media content such as radio and television. For example, Web sites such as washingtonpost.com, cnn.com, and usatoday.com consist of thousands of pages where the content dynamically changes. Furthermore, the pages within such Web sites contain sophisticated media effects such as moving graphics, sound, video clips, and other effects implemented with plug-ins, Java code, and the like to appear more enticing to those viewers who are familiar with traditional media such as television.

Creating and maintaining a large scale multimedia popular Web site involves many tasks. These include designing the site, organizing its content, developing it, and managing it on a daily basis. Typically, many people are involved in producing these sites. Those providing the content may be authors, graphic artists, or multimedia specialists who do not necessarily know how to program Web pages or other details of how a Web site is implemented exactly. Those responsible for the technical implementation of the site may understand how to program in HTML or Java but may typically know little about how best to present content.

Certain advanced tools have emerged for use in managing Web-based applications. One such tool is the Netscape Application Server™ (NAS) advanced application server software available from Netscape Communications Corporation. NAS (formerly known as KIVA Enterprise Server) allows developers to deploy Web-based application logic as a centralized entity separate from the Web servers that are responsible for assembling pages and transmitting them over a network to client browsers. The NAS server may also be used to manage transactions with back end databases in a manner which is transparent to client software. NAS thus frees Web site implementors from having to determine the details of how to deploy application logic as JavaScript or CGI code running on the Web servers or within the Java applets downloaded to Web browsers. The Web servers and Web browsers can therefore be programmed to implement presentation logic only, leaving the application logic to the application server. When changes may be necessary for the application logic, it need not necessarily require redevelopment of the presentation logic.

In addition, NAS supports application partitioning, which is a form of distributing application logic among multiple servers. The components of a large scale application can therefore be grouped to facilitate their execution in high demand applications. For example, NAS provides features such as dynamic load balancing wherein page requests can be routed to a least loaded server. NAS also supports caching the results of transactions, such as database queries, and subsequent requests for the same pages, may be transparently redirected to the cached information.

SUMMARY OF THE INVENTION

The present invention is a distributed publishing system which includes a content server that acts as a highly scalable page generation and content management system. The content server manages page generation in a dynamic delivery environment. Pages are generated automatically, on demand, by maintaining the form, or design of the pages, distinct from the content of the pages. When the pages are requested, the content server automatically joins the page content to the page design.

The content server generates and stores pages depending upon their expected use. For example, entire pages, or small page components referred to herein as "elements," are locally cached in a file or database for later access. Whether a page is cached as a completed unit or as a set of elements depends upon whether elements contain dynamic content. This permits efficient production of pages on demand.

More particularly, the content server identifies a page in a site catalog through a page name. Each page name has an associated template, or so-called root element; the same template can be associated with any number of page names.

Templates themselves are also treated as elements in an element catalog and identified by an element name. Each template typically includes instructions that describe how the content server should process certain contents of the page. Elements contain a set of instructions that determine how specific content is to be formed into pages or portions of pages. Elements can be relatively small, such as producing a single "href," or relatively large, comprising the instructions for an entire page. Elements generally fall into two categories, layout and logic. Layout elements describe where components are placed on a page, and logic elements describe the actual content or how to locate content. Elements can contain both standard HTML or special tags such as XML tags. The XML tags, which may be a form of server side markup language, can be used to retrieve data from a content catalog according to instructions specified by the elements. Elements of either type can also specify conditional behavior, which produces different results depending upon execution context specific variables.

The content server runs in a distributed, multi-tiered environment such as Netscape Application Server™. That is, the machines and software involved in the application are divided into three layers, or tiers, including (1) a client tier, where users interact with the content server via Web browsers to implement presentation logic; (2) a middle tier, comprised of a Web server, a Netscape Application Server™, and the content server application code for implementing the application logic which generates the Web pages dynamically; and (3) a database tier, which may include one or more database servers that permit interaction with back end databases to access information that forms the basis of the application, e.g., Web page content.

The content server provides a variety of ways to increase page production performance by implementing caching at various levels of a hierarchy. This hierarchical caching is in addition to the standard NAS-based memory caching and thus permits tuning of the caching implementation in order to optimize delivery of elements based upon how dynamic particular page elements are.

The lowest level of caching is a type of result set caching. Result sets are formed from the data that directly results from, for example, a back end database query operation. At this level of caching, the data is cached in its raw form by the content server after extraction from the database. Cached data is generally stored as an attachment to the table which was queried; however, it can be stored against any catalog or table in the database. Results set caching improves performance of the system as a whole by reducing the load on back end databases, as well as the response time experienced by end users. This particular kind of low level caching is advantageous when data is repeatedly served, and where it is reformatted for different delivery targets by the content server.

At a next level of hierarchy, the content server provides element caching. At this level of caching, the aforementioned elements are cached in a executable form. Thus, the element source code is retrieved and validated, and an execution tree representation of the element is built. It is this executable tree representation of the element which is cached. At the time that a page needs to be rendered, the associated executable elements are retrieved to the extent possible from the cache by the content server.

Any environment-specific variables for the particular viewer are then located and the element is then executed to render the page. More specifically, the content server also supports the concept of establishing a session for a given user. The content server maintains such a session as a set of unique context variables associated with the particular user or "connection." The existence of such a session makes it possible to maintain state information cross a stateless connection model. This means that pages can set session variables that are available to be used during element execution, without setting cookies or otherwise requiring that parameters be passed along with page requests.

Finally, the highest level supports completed page caching in which complete pages are served via the content server on request. This provides an extension to the NAS native memory cache, in that page data can be screened before serving this and different versions of the same cache page may be returned based upon the context criteria, such as browser type, user privileges, and other user-specific environment variables.

The hierarchical structure of caching within the content server thus enables a caching implementation which is optimized to the particular page dynamics. For example, some composed pages may contain data which is very dynamic. These pages are typically candidates for element or result set level caching. Element caching which may be implemented, for example, for rapid retrieval of image-based components such as navigational bars or indices on a page. Such elements may be relatively static—that is, they do not change so frequently as to require regeneration for each request, but may still have versions for specific user populations. These elements can thus be thought of as page parts and served back efficiently by the content server, while still allowing custom composition of other parts of the page as required.

In other instances, pages may be relatively static and therefore prime candidates for page level caching. However, even such page level caching may have properties associated with them so that a given page can be selected based upon user context.

Within NAS, multiple physical Web servers can be arranged in a cluster. Clustering provides advantages such as load balancing in highly demand driven environments. For example, a request for particular pages at the Internet Protocol (IP) level may be routed in a round-robin fashion among Web servers. NAS provides a feature of watching the load on all servers and routing requests to perform loading balancing. Therefore, even if a page request is directed to a particular server, if that particular server is heavily loaded, NAS may route the page request to a lesser loaded member of the cluster.

In the present invention, the cache server distinguishes whether the servers cache together or not. Using this so-called synchronous set caching, one member of a synchronous set of servers may be designated as a sync master. Synchronous set members share cache state information with other members of the same set. In this manner, if another member of the set retrieves a cached element, it can be determined if the local copy of the element is fresh. If not, the local cache copy is stale and therefore the sync master must be retrieved and used instead. In this manner, the benefits of caching among the cluster with load balancing, can be achieved while freeing the application developer from the concern of assuring that fresh content is always used.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The System Generally

Figure 1:
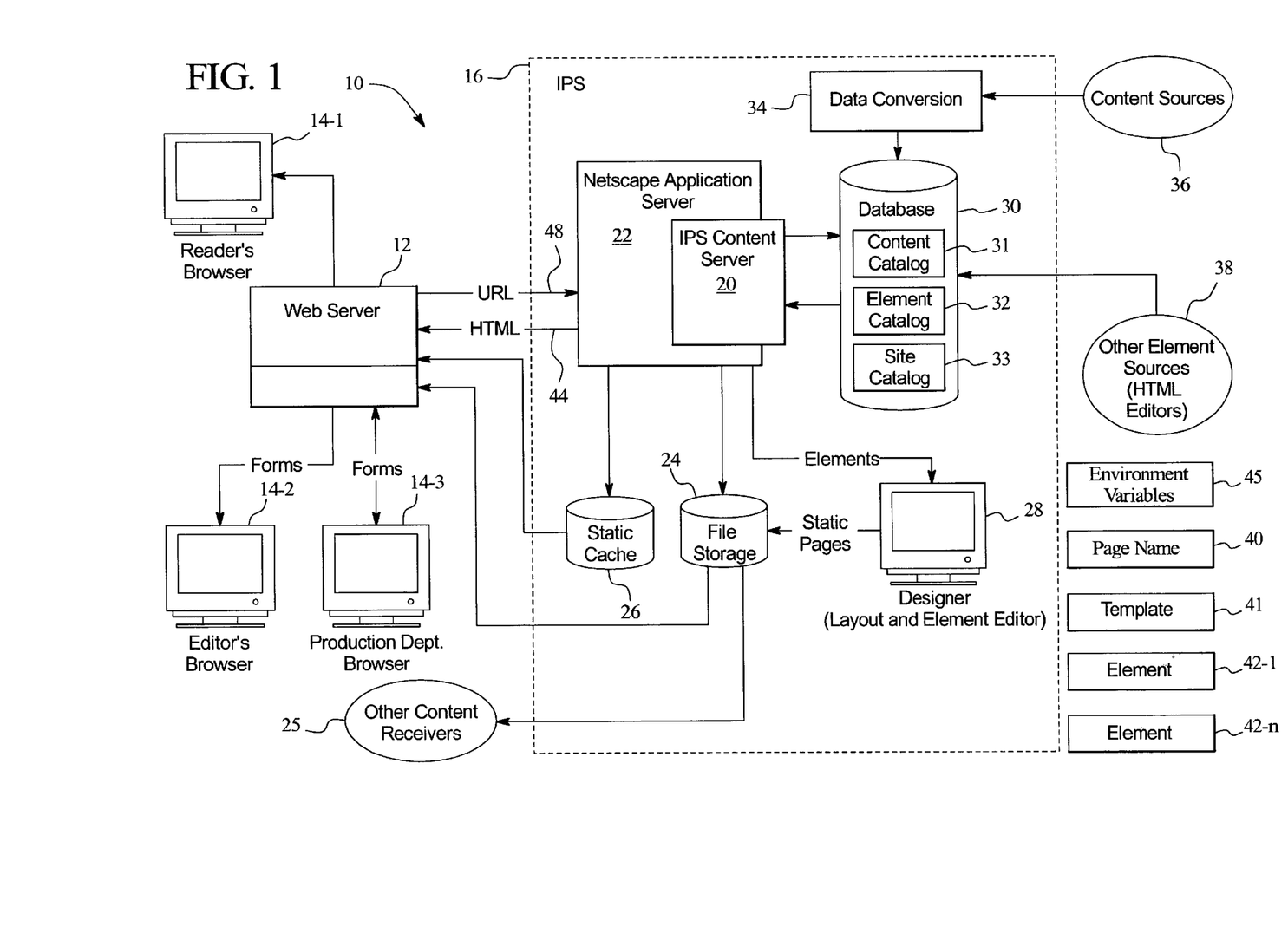
FIG. 1 is a block diagram of a distributed publishing system that makes use of a content server having hierarchical caching capabilities according to the invention.

Turning attention now to FIG. 1 more particularly, there is shown a system 10 for the electronic publication and distribution of documents having a variety of levels of dynamic content which makes use of hierarchical caching techniques according to the invention. With such techniques, an entire page may be cached. In other instances, only a small piece or element of the page is cached. For example, element or component level caching permits the personalization of particular Web pages for particular viewers while still maintaining high performance. Furthermore, lower level caching, such as result set caching, eliminates request load on back end databases. Finally, synchronous set caching permits the implementation of caching among environments where storage devices and/or servers are distributed.

More particularly now, the distributed publishing system 10 consists of one or more Web servers 12, and a number of browsers 14 such as an end user or page reader's browser 14-1, an editor's browser 14-2, and production department browser 14-3. The Web server 12 and browsers 14 constitute a client tier of the system 10 in which users interact with the system to view Web pages.

A middle tier of the system includes a content server 20, which executes within the context of an application server such as Netscape Application Server™ (NAS) 22. The content server 20 includes file storage 24, static cache storage 26, and additional elements of an Internet publishing system (IPS) 16 such as a designer interface 28 and database 30. Within the database 30 are stored various elements such as a content catalog 31, element catalog 32, and site catalog 33. A data conversion process 34 provides the ability to import data obtained from external content sources 36 such as back end databases, news feeds, and the like. Other content sources such as HTML editors 38 also provide content to the database 30.

An end user or reader's browser 14-1 is used to view completed Web pages through the Web server 12. An editor's browser 14-2 allows editors to provide input to the system 10 such as, for example, forms or content to the content server 20 to be formatted into published Web pages. A production department browser 14-3 may be used to further define form and content files.

The content server 20 is central to the operation of the system 10. The content server 20 is a Web server application, preferably layered on the Netscape Application Server™ (NAS) 22 (formerly known as KIVA). The content server 20 enables the system 10 to create, manage, and serve content from the database 30 to the browsers 14 through the Web server 12.

The content server 20 contains application logic for storing and retrieving data files in the database 30. Thus, for example, a catalog manager portion of the content server 20 may add, modify, or delete rows in a database table stored in the database 30. With content server tags, database tables may be queried and the results of queries may be manipulated.

The database 30 may typically be a relational database that permits the storage of content and efficient way for storage search and retrieving large amounts of content. Such databases may include Microsoft SQL Server 6.X, Oracle, Sybase or Informex databases.

Using the content server 20, a typical Web page does not exist in its final form until the reader browser 14-1 requests it, such as by its Uniform Resource Locator (URL). This means that there is not necessarily a one-to-one mapping between a Web page URL and a file on the Web server 12 or even a file within the database 30.

In particular, with the content server 20, a page is identified within the site catalog 33 through a high level data object such as a page name 40. Each page name 40 may have associated with it one or more templates 41. The templates 41 may also be associated with any number of page names 40. The templates 41 themselves are also stored as elements in the element catalog 32 and identified by an element name. The templates 41 are typically comprised of other elements 42-1, . . . , 42-n also stored in the element catalog 32.

The templates 41 and elements 42 provide a means for separating form from content. By separating the form and content of a Web page, a page "form" definition may be used to build different end resulting pages whose layout is consistent but where the content is different. Thus, for example, the templates 41 in general present forms for content stored in flat files in the file storage 24, static cache 26, or data that is otherwise retrievable from the content catalog 31 in the database 30. In a preferred embodiment, in order to create such templates 41, a tool such as the Designer Layout and Element Editor, available from FutureTense, Inc. of Acton, Mass., may be used.

Templates 41 also serve as a place holder for varying text and images that comprise the content. Templates 41 therefore include instructions that define how the content server 20 will locate, select among, and process the content portions. This set of instructions may be a combination of HTML, JavaScript, XML, Server Side Markup Language, or other instructions. The instructions may, for example, be instructions to draw content from a field in a particular database table contained in the content catalog 31. Alternatively, the instructions can be relatively complex, such as in an instance where a page will require conditional behavior and/or customization based upon session state or environment variables 45 specific to a particular reader 14-1.

The site catalog 33 is a list of page names maintained by the content server 20. Thus, to render upon request of a reader's browser 14-1 to view a particular page, the Uniform Resource Locator (URL) of the page is first looked up in the site catalog 33 to determine an associated page name 40. The page name 40 is then read to retrieve the templates 41 and elements 42 from the element catalog 32 in order to obtain the content and instructions for how to render the page.

Elements 42 are the instructions that are used to determine how specific content is formed into all or part of a page. Elements can be fairly small, producing a single href such as a graphic for a toolbar or the like, or relatively large, producing a whole page.

Elements 42 generally fall into two classes. Layout elements describe where components are placed on a page, and logic elements describe the actual content of a page.

Elements 42 can contain both standard HTML and special tags called XML tags. Each XML tag may be used to implement a type of server side markup language which, for example, may contain instructions for retrieving data from the content catalog 31 according to instructions specified by other elements 42 in the element catalog 32.

Data contained in the content catalog 31 is periodically updated through a data conversion process 34 that retrieves content from content sources 36. Such content sources 36 may include, for example, back end databases such as news feeds, corporate databases, and other sources of information. The data conversion process 34 provides logic necessary for the content server 20 to interface with one or more of the content sources 36.

The content server 20 also maintains session state information for multiple users. For example, when a user at the browser 14-1 requests a page from the content server 20, a session state is established. The content server maintains this session state information 45 as a unique context associated with the particular network layer connection to the user 14-1. By maintaining state session variables, subsequent pages can exhibit conditional behavior variables 45 specific to the particular user without setting cookies within the users browser, without requiring the user to pass along parameters with the URL requests 48, and without downloading complex JavaScript applets.

The content server 20 thus also permits content to be displayed based upon the identity or other parameters specific to the particular user. Page personalization is thus a simple matter because the content server 20 has access to state information associated with the session. For example, a certain page may be associated with limited functionality for unsubscribed visitors, and other pages may provide more functionality may be presented to members of groups who have paid for access.

Content itself may also be user-specific based upon user's parameters. For example, if the system 10 is for publishing information about sport scores, users on the West Coast may obtain information about particular sports teams which are of more interest to them than users in an East Coast location. By providing the availability of such session information to the content server 20, templates 41 and elements 42 may determine how content on the pages is displayed at the time they are created.

Page Level Caching

Caching is a process by which even dynamic pages or portions thereof are saved for future requests. For example, when a page is requested a second time, the cache 26 is checked for a copy prior to its re-generation. In general, if the system 10 returns the cached copy, this results in a much faster response since minimal access to internal database 30 as well as external databases 36 are required.

The content server 20 also provides different mechanisms that can control behavior of the cache 26. These criteria may depend upon absolute or relative lifetime before it is deleted. Default criteria can also be set for pages 40 that do not specify their cache level criteria. In addition, tags may be stored to trigger deletion of related information from the cache. For example a page containing a list of headlines can trigger deletion of associated story pages when a headline page is created in the cache.

Figure 2:
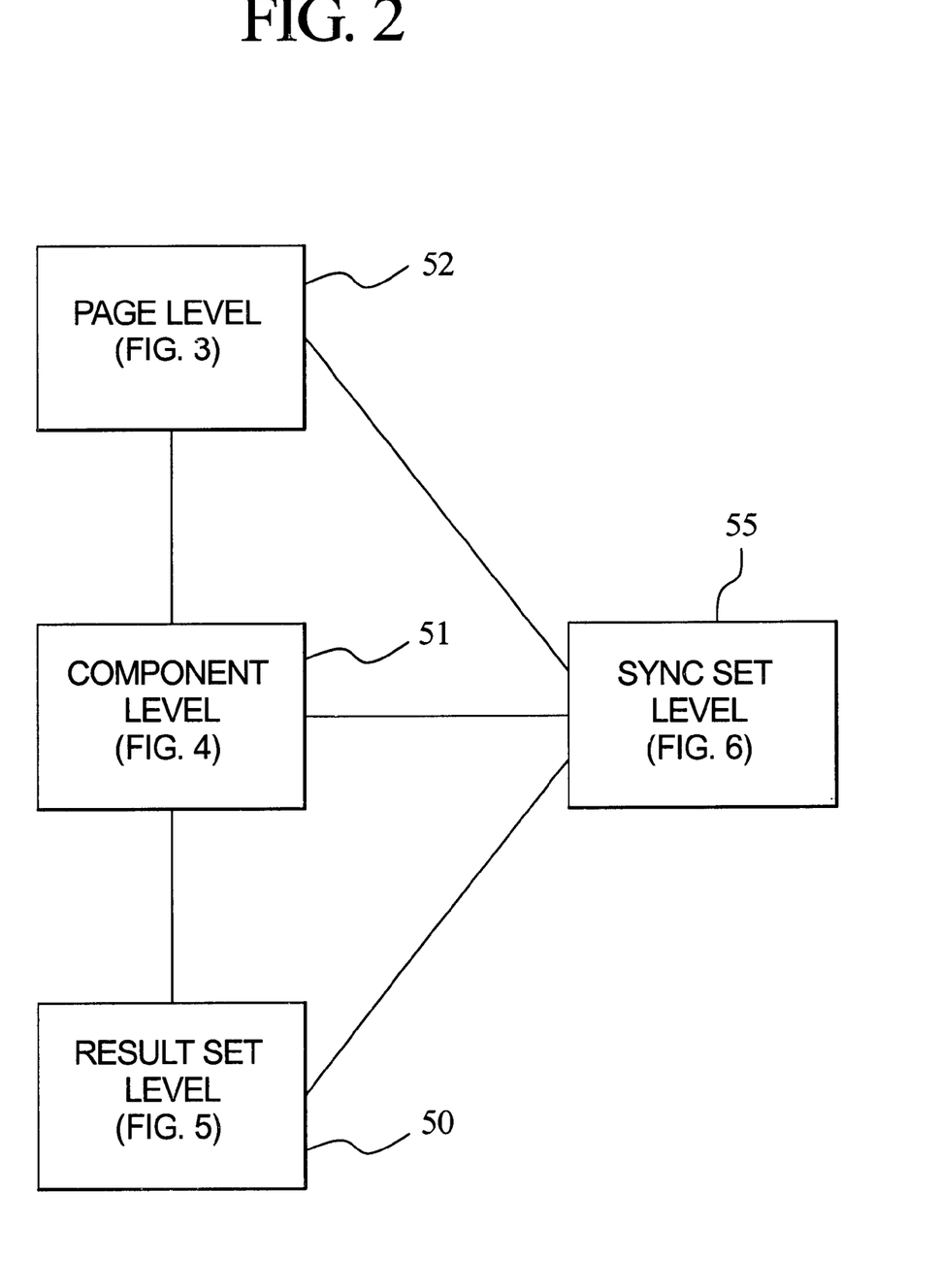
FIG. 2 is a conceptual view of the various tiers, or levels, of caching supported by the content server.

The content server 20 provides various levels of caching as shown in FIG. 2. These include caching at a lowest level or result set level 50, a component or element level 51, and a page level or highest level 52. In addition, synchronous set caching 55 may be provided at one or more of the levels. Each of these caching features will be described now in greater detail.

Page level 52 caching is disk-based caching of HTML pages that have been completely composed by the content server 20. These completed pages are served via the content server 20 on request, but typically after some small processing. This differs from NAS native memory caching in that the data typically is screened and served by the content server 20 before being provided to the Web server 12. For example, different versions of the same cached page may be selected from user session context information 45.

Figure 3:
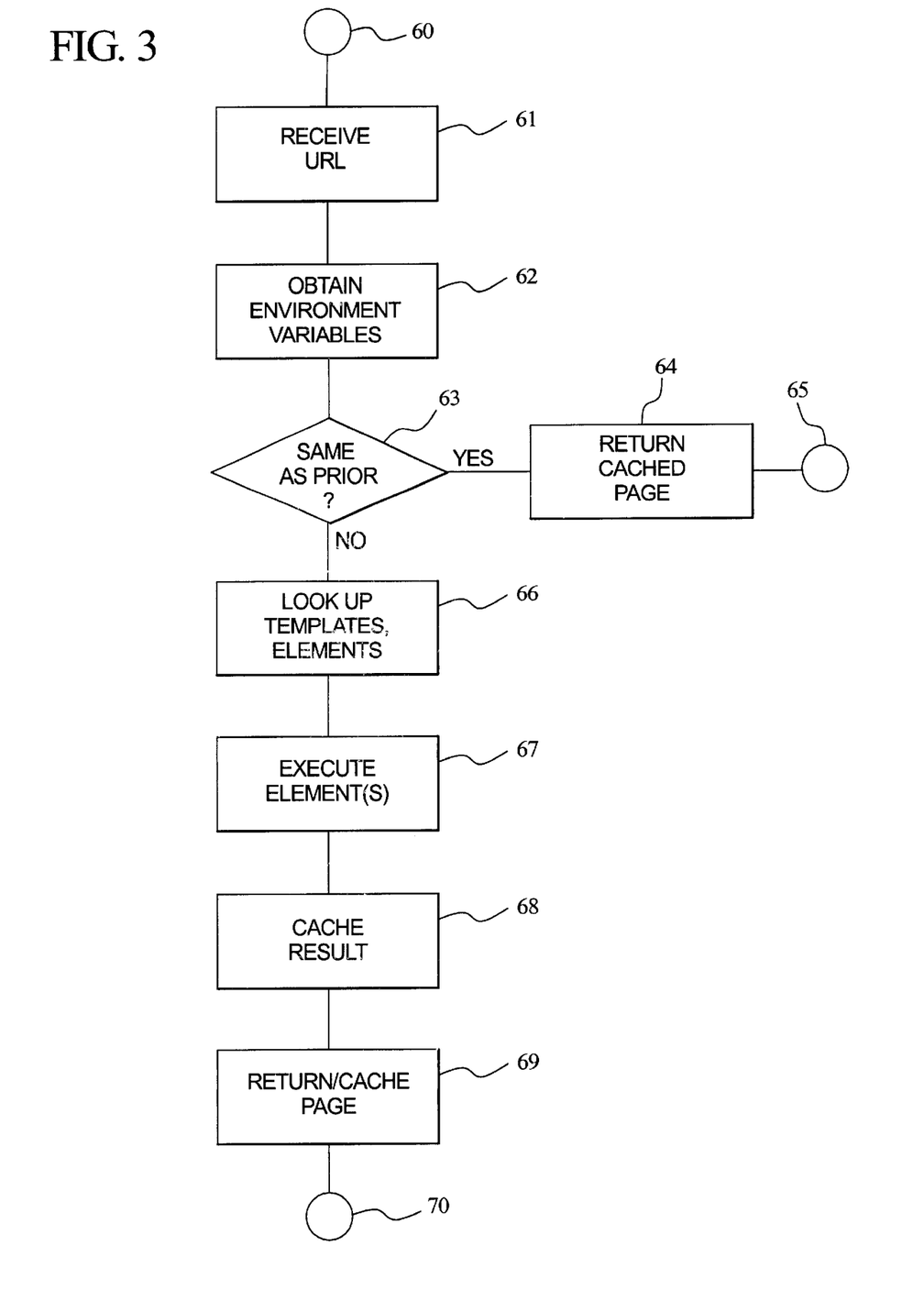
FIG. 3 is a series of steps performed by the content server to implement the highest level, or page level, caching.

A process for implementing page level caching is shown in FIG. 3. From an initial state 60, a state 61 is entered when a URL 48 is received from a browser 14. In a next state 62, any environment state variables 45 associated with a particular session are checked against the requested URL. If the URL is one which has been requested in the same environment in the past, then processing can proceed to state 64 where the page is retrieved from the cache 26.

If, however, environment variables 45 are different and/or the requested page is not static, then a state 66 is entered in which the templates 41 and elements 42 associated with the page name 41 for the URL are looked up in the site catalog 33 and element catalog 32. The elements 42 referenced by the templates 41 are then executed by the content server 20 and rendered as an HTML page. The HTML page is then cached in the static cache 26 in state 68 and then returned to the Web server 12 in state 69. The page is then returned by the Web server 12 to the browsers 14.

Element Caching

Figure 4:
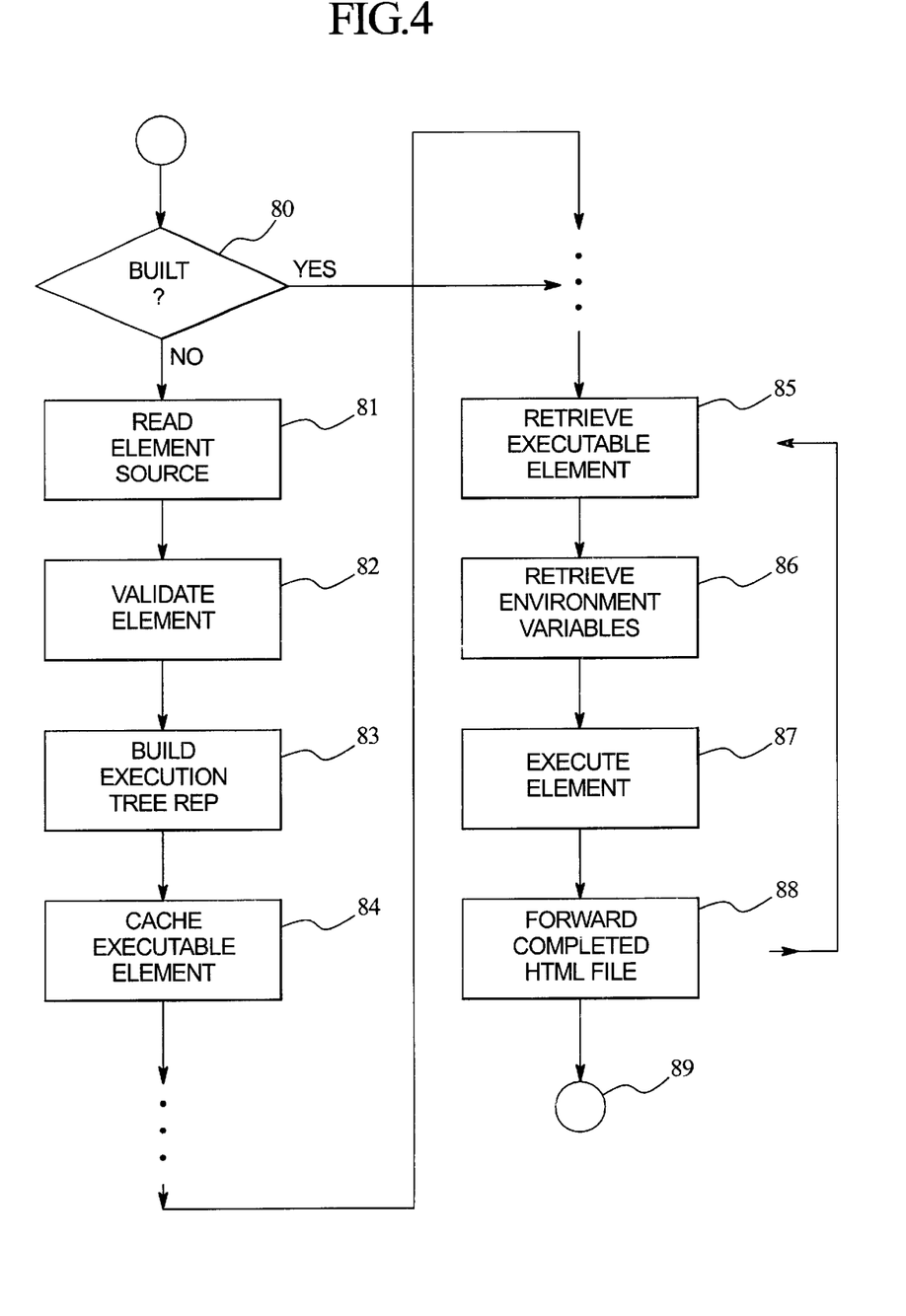
FIG. 4 is a series of steps performed to implement executable element level caching.

As previously mentioned, the elements 42 may also themselves be cached. A process for implementing such element level caching is shown in FIG. 4. After having received an initial request for a page by URL 48, the elements 42 associated with the page are retrieved from the element catalog 32. In state 80, if an execution tree representation for such elements have previously been built, then processing may skip ahead to state 85. If an execution tree has not previously been built, a state 82 is entered in which the elements 42 are validated. The validation process, for example, examines the element code such as for syntactical correctness. Because the elements 42 may themselves depend upon environment specific information, an execution tree representation of the element 42 is next built in state 83. It is this execution tree representation of the element which is cached in the next state 84. This execution based version of the element 42 may be cached using the NAS native memory caching features.

The element caching scheme results in rapid retrieval of elements 42 such as may be used to implement page parts which may not be completely renderable until such time as the specific context information 45 is available.

When the URL 48 is presented a second time to the content server 20, if elements 42 on the page have been previously evaluated available in the cache 26 as cached elements, then they are first retrieved in a state 85. The state information 45 associated with the present context are then retrieved in state 86. At this point in state 87, execution of the element may be completed, and in state 89, the completed HTML file may be forwarded to the Web server 12. The process may iterate at this point back to retrieving executable elements and additional pages as they may be needed.

As an example of how element based caching may be advantageous, consider the situation where a page is to provide sports information for the top five local sports teams in a particular locale. As the user presents a URL to the content server 20, the particular URL is first located in the page name table in the site catalog 33. The templates 41 associated with the page are then read and in the various elements 42 which comprise the instructions to construct the page are retrieved. One of the elements 42 may contain executable code that looks up content information 45 for the present user to obtain five teams he has previously indicated as being of interest. For example, a user located in Boston may be interested in obtaining information about the Red Sox, Celtics, Bruins, and Patriots. The user specific information may be contained in the content catalog 31 or may be also cached as well. The various scores for the indicated teams are then retrieved from the content catalog 31 which may need to be located by obtaining them from the content sources 36 or which may have previously been fetched and thus are already located in the cache.

Once these elements 42 are retrieved, the information can be combined with the previously cached executable version of the element 42 which contains the display logic for presenting the sports scores.

Alternatively, for a user in Los Angeles, the execution tree representation for the Web page may be the same with the only difference being in the particular information which is to be obtained for this user. For example, the user in Los Angeles area may be interested in scores for the Dodgers, Lakers, Kings, and Raiders. The executable portions of the element 42 already having been cached, only process steps 85 need to be executed for the Los Angeles user where the environment-specific variables specify the West Coast sports team scores.

In other instances, the cached elements 42 may be relatively simple such as navigational bars or page indices that may be relatively static, that is, elements 42 for which change is not so frequent as to require regeneration for each URL request. However, such elements 42 may have different versions for specific user populations that are each cached. These components can thus be thought of as page parts that are served back efficiently by the content server while still supporting custom composition of the whole page as determined by context.

Result Set Caching

Content server 20 also supports a type of result set caching in which the data cached are the direct results of query operations such as those made to the content sources 36. Result set data is generally stored attached to an instruction in the element 42 which queried the table. However, it can also be stored against any element 42 in any catalog in the database 30. An implementation of result set caching in aforementioned sport score, for example, would be the realization that more than one user is typically going to request sport scores in the Boston area and, therefore, the results of querying the database 36 to obtain sport scores should itself be cached. Result sets which are cached may also have time out and size constraints defined in their property file as well.

Figure 5:
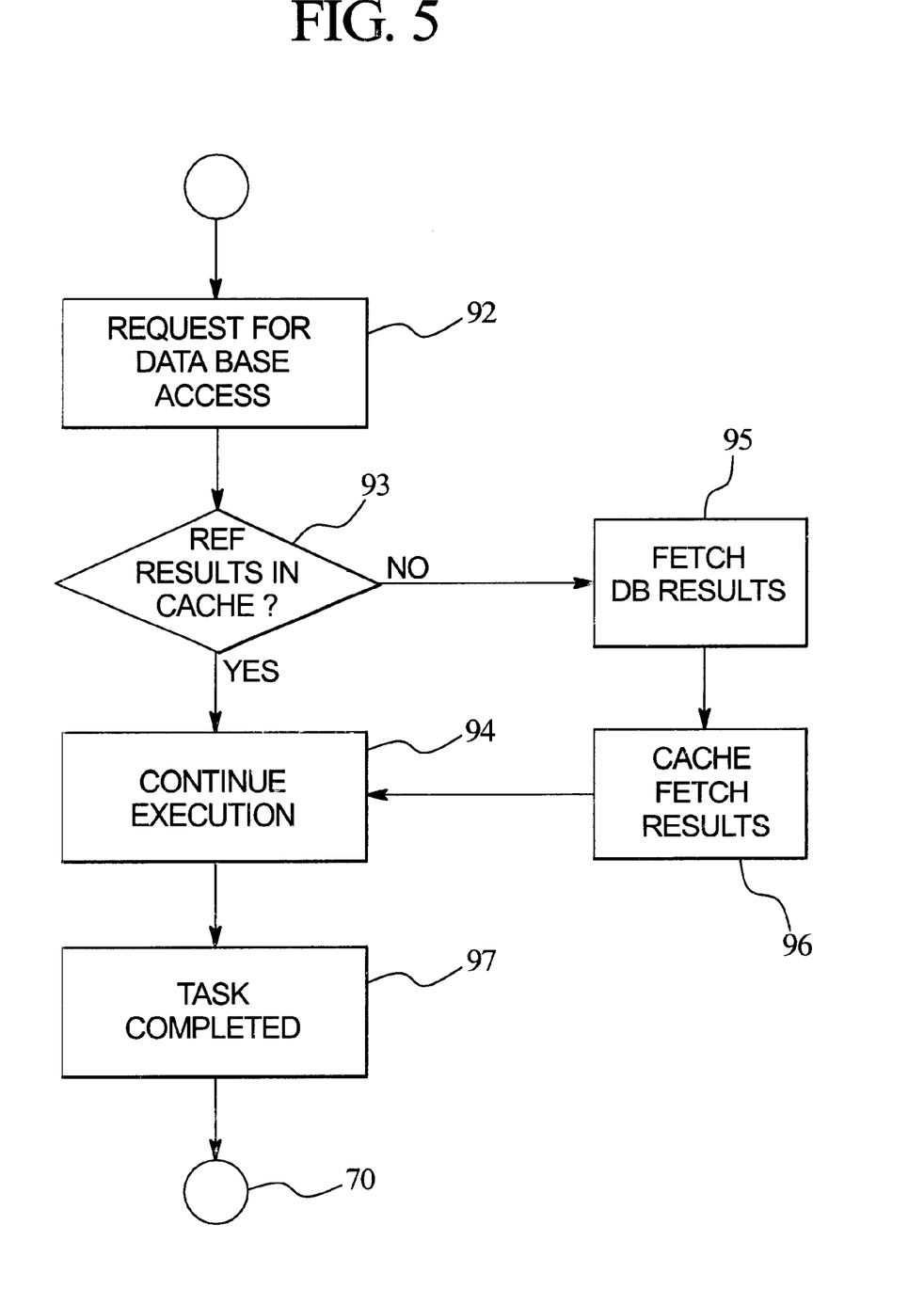
FIG. 5 is a series of steps performed implementing result set caching.

Such a process is shown in FIG. 5. From an initial state 90, a state 92 is entered during which a reference is made to data stored in the database 30. A process state 93 is next entered in which it is determined whether the referenced results are already available in the local cache 26. If this is not the case, then the database results are retrieved in state 95 such as by going through the data conversion process 34 to obtain from the content sources 36 the requested information. However, if the data is not already in the cache, the fetch results are cached in the content catalog 31 in state 96.

In either event, once the database results are available, a state 94 is entered in which execution may continue. Eventually, a state 97 is reached in which the task is completed.

Result set caching can be used as a powerful tool to retrieve database managed data and process it in multiple ways without having to perform multiple database retrievals outside of the content server 20 environment. This improves performance of the system 10 as a whole reducing the load on external contents sources 36, in effect increasing response time for particular users. This type of lower level caching is advantageous when data is expected to be repeatedly served as personalization or context specific requirements against when it is presented and thus may be reformatted for different delivery targets. This provides higher performance results as opposed to the page level caching previously described which would not be appropriate for data that must be reprocessed for delivery.

Cluster Synchronization

As mentioned previously, the Netscape Application Server™ 22 supports scalable application partitioning to provide an architecture for sharing work load for high volume transactions among multiple application servers. So-called application server clusters can thus scale to support a large number of concurrent requests among multiple hardware platforms. NAS supports features that deliver this performance including multi-threading, object management and dynamic load balancing.

Figure 6:
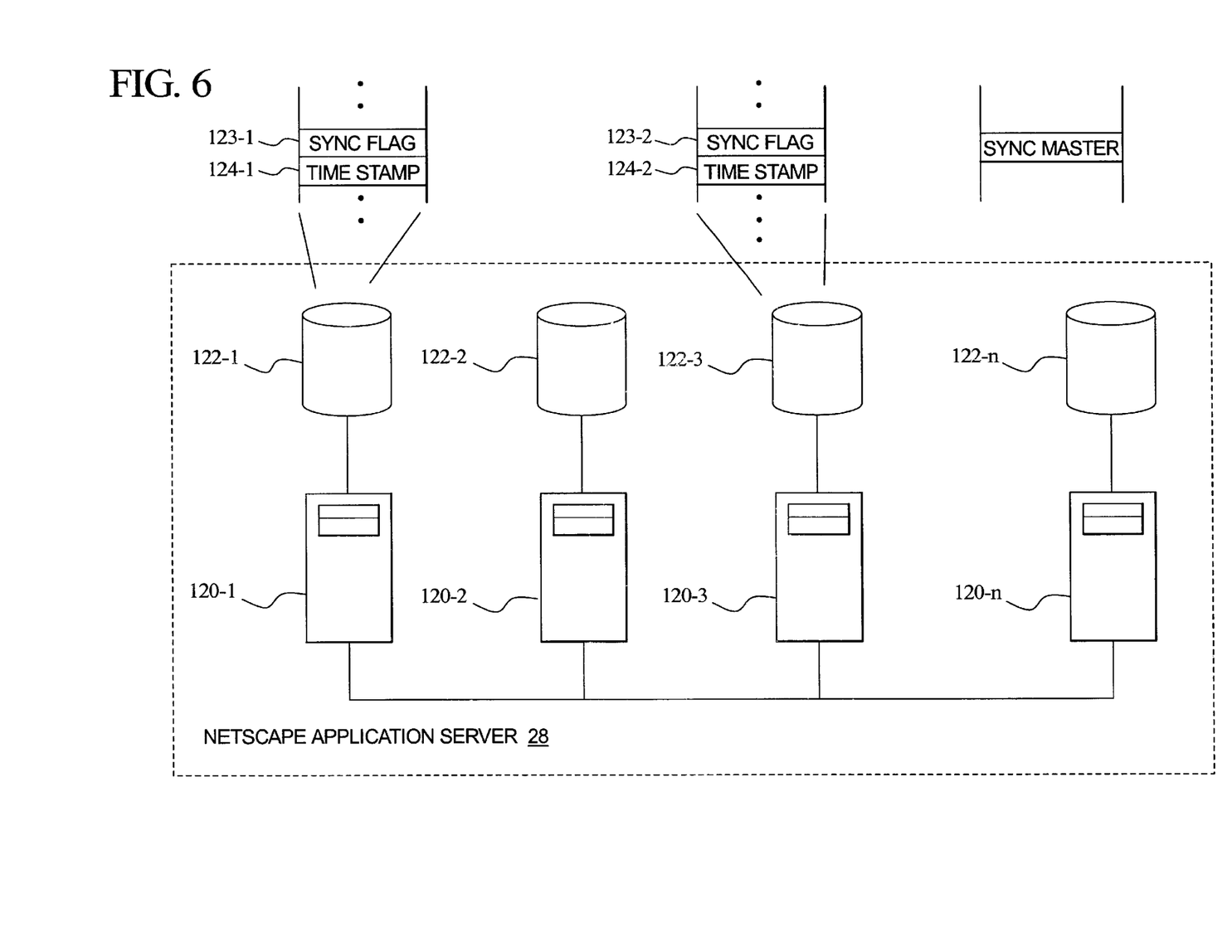
FIG. 6 is a series of steps performed to implement cluster synchronous set caching.

However, a complication occurs for caching in this environment as shown in FIG. 6. A particular Netscape Application Server™ 22 environment may actually include a number of physical processors 120-1, 120-2, . . . 120-n and associated cache storage devices 122-1, 122-2 . . . 122-n. Although each process 120 has its own cache, it cannot determine the cache contents of other processes.

Also, under NAS it is not necessarily known which particular processor 120 will be executing a particular URL request. For example, requests at an IP level, even for a specific server processor 120, may be rerouted on a round-robin basis depending upon the particular loads on each server 120.

The present invention therefore distinguishes whether a particular cached primitive is to be cached together among all processors.

In particular, each cached primitive such as a page, element, or result set, preferably includes synchronous set information 130 such as including a sync flag 123 and a time stamp 124.

Once a particular primitive is registered as a cluster member within the NAS hierarchy, NAS provides cluster members with the ability to share state information with other cluster members through a state tree. In this implementation, a master flag 125 associated with the particular cluster member is set to indicate which version of the primitive is treated as the master. Sync flags 123 and time stamps 124 are then used to insure that the remaining copies of the information in the other caches 122-1, . . . 122-n remain in synchronism, without the need to provide to implement multiple querries out to the external sources 36.

Figure 7:
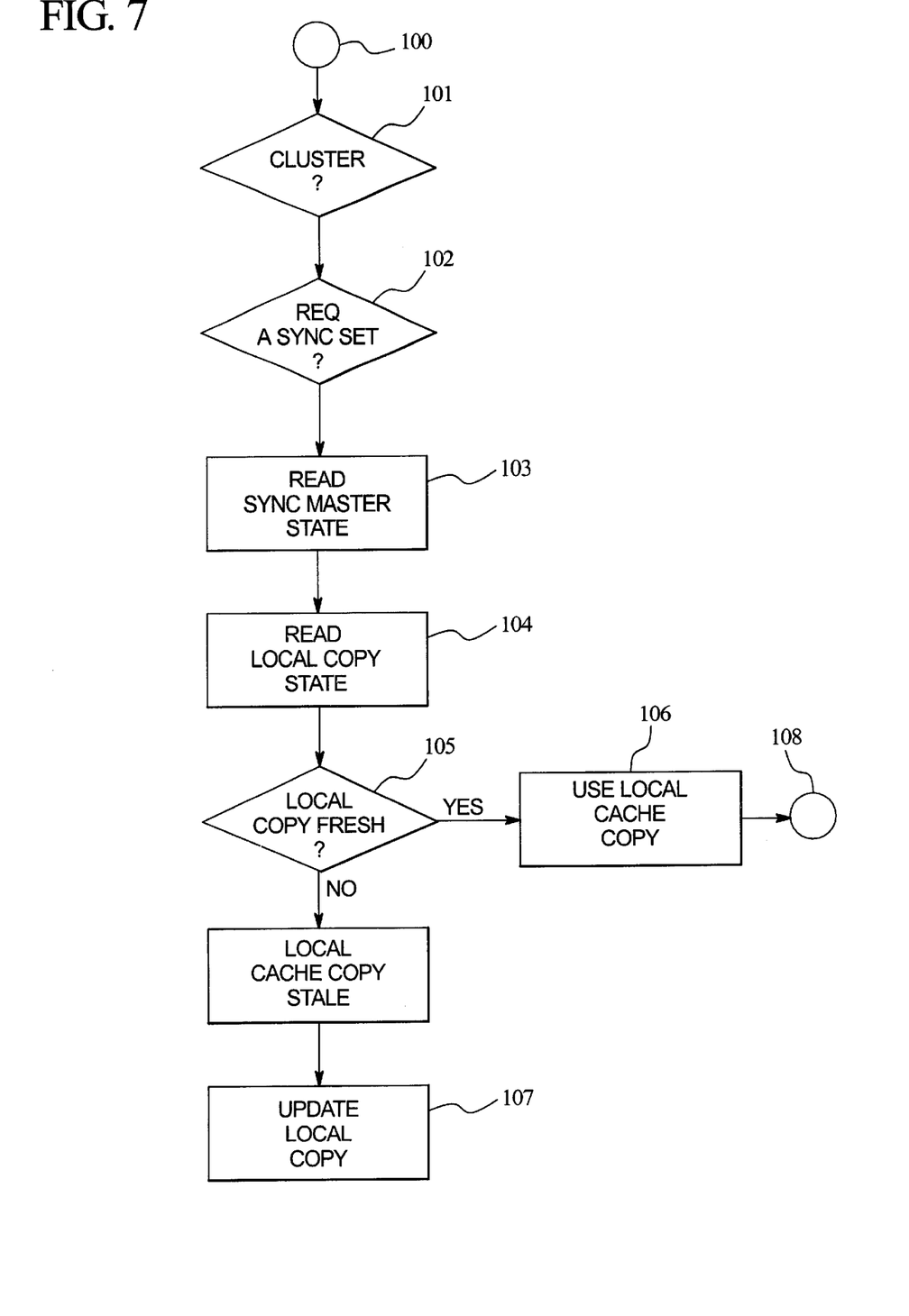
FIG. 7 is a more detailed view of an application server cluster, synchronization flag, and time stamps.

To accomplish this, as shown in FIG. 7, from an initial state 100 a state is entered 101 in which it is determined whether or not a particular primitive, such as for example an element 42, is to be executed on a cluster on a synchronous set basis. If this is the case, then processing continues to state 102 in which is determined whether or not this particular element 42 belongs to a synchronous set. If that is the case, then processing proceeds to state 103 in which the state of the sync master associated with the synchronous set is read. In state 104, the state associated with the local copy is also read. If the local copy is fresh, as determined in state 105, then the local cache copy may be used in state 106. The state information may, for example, be time stamp information which was set at the time that the particular copy was stored in the associated physical cache 122-1, 122-2 . . . 122-N. If, however, the local copying is stale, then it is necessary to enter a state 107 in which the content is updated from locally available information.

In particular, before a cache server uses its own local copy of a cache primitive, it checks the sync master 125 to determine if its copy is older. If this is the case, it must update its own copy. Likewise, each cache server must update the master 125 each time that it modifies a cache primitive in the synchronous set.

Thus, by determining whether an element is a member of a cluster, and if the element belongs to a synchronous set, before looking in a local cache, the shared state information for information on a time stamp from a cluster master is examined. If the local copy is younger, then it is okay to use it. If, however, the local copy is older than the sync master 125, then it will be necessary to obtain the information from the sync master 125 or alternatively to resubmit a database query.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for use in an electronic publishing system for generating pages on demand in response to a page request, the method comprising the steps of:
   defining a plurality of elements, each of the elements indicative of at least a portion of a page, the elements further comprising layout, logic, root, and template elements;
   receiving a page request to produce a page, including a page name indicative of at least one element in an element catalog;
   locating one or more of the elements associated with the page name in the element catalog, the elements for defining instructions for how to render the page; and
   determining whether the rendered page or elements of the page are to be cache primitives depending upon the value of at least one context specific variable associated with the page request, the primitives arranged in a hierarchy and corresponding to at least one element in the element catalog.

2. A method as in claim 1 wherein the elements specify multiple rendered versions of the page which result from different values of one or more of the context specific variables.

3. A method as in claim 2 additionally comprising the step of:
   caching the multiple rendered versions of the page; and
   in response to receipt of a request for the rendered page, serving a selected one of the cached versions of the rendered page based upon the value of at least one context specific variable.

4. A method as in claim 1 additionally comprising the steps of:
   validating at least one element to produce an execution tree representation of the element; and
   caching the execution tree representation of the element.

5. A method as in claim 1 wherein the page is defined as one or more templates, and each template includes one or more elements.

6. A method as in claim 1 wherein the template specifies formatting for the page separately from specifying how to locate content for the page.

7. A method as in claim 1 additionally comprising the step of:
   in response to receipt of a request for the rendered page, reading at least one cached execution tree representation of a page element from the cache.

8. A method as in claim 7 additionally comprising the step of:
   applying at least one context specific variable to the execution tree representation of an element to render the page.

9. A method as in claim 1 wherein the electronic publishing system is implemented in a server cluster environment in which page requests for a particular page are not necessarily routed to the same server each time, additionally comprising the step of:
   storing synchronous set information for each cache primitive;
   storing synchronous set information among servers in a cluster; and
   in each server, from the synchronous set information, determining whether a local cache copy is stale.

10. A method as in claim 9 wherein the synchronous set information identifies a synchronous set master.

11. A method as in claim 9 wherein the synchronous set information includes time stamp information for the synchronous set master.

12. A method as in claim 1 wherein at least one element references content for the page contained in an external database, such content is retrieved as a database result set, and the step of determining whether to cache additionally comprises the step of determining whether to cache the result set depending upon the value of at least one context specific variable.

13. A method for generating pages in a distributed electronic publishing system in which instructions for locating content information for the page is stored separately from formatting information specifying how to format the page, and wherein the content for a given page is expected to be different for different instances of a request issued for the page, the method comprising the steps of:
   defining a plurality of elements, each of the elements indicative of at least a portion of a page, the elements further comprising layout, logic, root, and template elements;
   preprocessing a page definition to the extent possible without having page request instance variables available to generate an execution tree representation of the page, the execution tree representation indicative of at least one of the elements of the page;
   caching the execution tree representation of the page, the caching further comprising page, element, and result level caching; and
   upon receipt of a request to produce the page, reading the cached execution tree representation of the page and applying the page request instance variables to generate a completed page.

14. A method for generating and storing web pages and portions of web pages by a set of catalogs for mapping requested page names to the contents of the page and concurrently gathering primitives about the requested page comprising:
   defining a site catalog indicative of a plurality of web pages, the site catalog having page names corresponding to at least one of the plurality of web pages;
   defining a plurality of elements in an element catalog, the elements further comprising classes including layout, logic, root, and template elements;
   defining a subset of the plurality of elements as the root elements, the root elements indicative of a plurality of other element comprising at least one of the plurality of web pages;
   determining a request to generate a web page by receiving a requested page name from a web server;
   mapping the requested page name into the site catalog to determine the root element indicative of the requested web page;
   determining, from the root element, the corresponding elements in the element catalog;
   retrieving, from the element catalog, the elements corresponding to the requested web page;
   processing each of the elements according to instructions contained in each of the elements;
   computing, from the processed elements, an execution tree representation of the completed web page; and
   caching at least a portion of the completed web page, the caching further comprising page and element level caching.

15. The method of claim 14 wherein processing the elements further comprises retrieving, based on instructions in at least one element, information from a content catalog.

16. The method of claim 15 wherein the content catalog further comprises a database.

17. The method of claim 16 wherein the information further comprises an object in the database.

18. The method of claim 15 wherein the caching further comprises result set caching of the information from the content catalog.

19. The method of claim 14 further comprising defining a synchronization set, the synchronization set indicative of which of the cached elements and pages are current.

20. The method of claim 14 further comprising displaying, via the web server, the web page at a browser in communication with the web server.

21. The method of claim 14 wherein the instructions further include at least one of HTML, Javascript, XML, and Server Side Markup Language instructions.

22. The method of claim 19 wherein the cached elements further comprise primitives, the primitives including security primitives and cache primitives.

23. The method of claim 14 further comprising context specific variables, wherein processing the instructions includes referencing the context specific variables and conditionally executing the instructions as a result of referencing.

24. A system for generating and storing web pages and portions of web pages by a set of catalogs for mapping requested page names to the contents of the page and concurrently gathering primitives about the requested page comprising:
- a site catalog indicative of a plurality of web pages, the site catalog having page names corresponding to at least one of the plurality of web pages;
- an element catalog having a plurality of elements, the elements further comprising classes including layout, logic, root, and template elements, the root elements indicative of a plurality of other elements comprising at least one of the plurality of web pages;
- a web server operable to receive a requested page name from a user;
- a content server operable to determine a request to generate a page by receiving the requested page name from the web server, the content server further operable to map the requested page name into the site catalog to determine the root element indicative of the requested web page;
- a template, defined by the root element, indicative of the elements in the element catalog corresponding to the completed web page;
- an execution tree representation of the completed web page, the content server operable to compute the execution tree representation by processing each of the elements according to instructions contained in each of the elements; and
- a hierarchical cache operable to cache at least a portion of the completed web page, the caching further comprising page and element level caching.

25. The system of claim 24 further comprising a content catalog, wherein processing the elements further comprises retrieving, based on instructions in at least one element, information from the content catalog.

26. The system of claim 25 wherein the content catalog further comprises a database.

27. The system of claim 26 wherein the information further comprises an object in the database.

28. The system of claim 25 wherein the cache is further operable to store result set caching of the information from the content catalog.

29. The system of claim 24 further comprising a synchronization set, the synchronization set indicative of which of the cached elements and pages are current.

30. The system of claim 24 further comprising a browser operable to display, via the web server, the completed web page.

31. The system of claim 24 wherein the instructions further include at least one of HTML, Javascript, XML, and Server Side Markup Language instructions.

32. The system of claim 24 wherein the cached elements further comprise primitives, the primitives including security primitives and cache primitives.

33. The system of claim 24 further comprising context specific variables, wherein processing the instructions includes referencing the context specific variables and conditionally executing the instructions as a result of referencing.

34. A computer program product including computer program code for generating and storing web pages and portions of web pages by a set of catalogs for mapping requested page names to the contents of the page and concurrently gathering primitives about the requested page comprising:
- computer program code for defining a site catalog indicative of a plurality of web pages, the site catalog having page names corresponding to at least one of the plurality of web pages;
- computer program code for defining a plurality of elements in an element catalog, the elements further comprising classes including layout, logic, root, and template elements;
- computer program code for defining a subset of the plurality of elements as the root elements, the root elements indicative of a plurality of other element comprising at least one of the plurality of web pages;
- computer program code for determining a request to generate a web page by receiving a requested page name from a web server;
- computer program code for mapping the requested page name into the site catalog to determine the root element indicative of the requested web page;
- computer program code for determining, from the root element, the corresponding elements in the element catalog;
- computer program code for retrieving, from the element catalog, the elements corresponding to the requested web page;
- computer program code for processing each of the elements according to instructions contained in each of the elements;
- computer program code for computing, from the processed elements, an execution tree representation of the completed web page; and
- computer program code for caching at least a portion of the completed web page, the caching further comprising page and element level caching.

* * * * *